(12) United States Patent
Manjunath et al.

(10) Patent No.: US 8,967,117 B2
(45) Date of Patent: Mar. 3, 2015

(54) THROTTLE CONTROL ASSEMBLY WITH INTEGRATED SAFETY SWITCH

(75) Inventors: Niranjan Manjunath, Karnataka (IN); Shakil Moonamkandy, Karnataka (IN)

(73) Assignee: Honeywell International Inc., Morristown, NJ (US)

( * ) Notice: Subject to any disclaimer, the term of this patent is extended or adjusted under 35 U.S.C. 154(b) by 353 days.

(21) Appl. No.: 13/604,015

(22) Filed: Sep. 5, 2012

(65) Prior Publication Data
US 2014/0060237 A1 Mar. 6, 2014

(51) Int. Cl.
F02D 11/04 (2006.01)

(52) U.S. Cl.
USPC ........................................ 123/400; 74/502.2

(58) Field of Classification Search
CPC . F02D 11/04; F02D 11/02; F02D 2009/0254; F02D 9/1065
USPC ............... 123/399, 400; 74/490.14, 491, 495, 74/501.6, 502.2, 519, 523
See application file for complete search history.

(56) References Cited

U.S. PATENT DOCUMENTS

| 4,856,471 | A | | 8/1989 | Pettinelli | |
|---|---|---|---|---|---|
| 5,685,271 | A | * | 11/1997 | Taomo et al. | 123/398 |
| 5,775,167 | A | * | 7/1998 | Maietta | 74/480 R |
| 5,829,312 | A | * | 11/1998 | Berg et al. | 74/502.2 |
| 6,551,153 | B1 | * | 4/2003 | Hattori | 440/87 |
| 7,591,126 | B2 | * | 9/2009 | Cox | 56/10.8 |
| 7,735,392 | B2 | * | 6/2010 | Poulos et al. | 74/502.2 |
| 8,082,819 | B2 | * | 12/2011 | Case et al. | 74/501.6 |
| 8,695,744 | B1 | * | 4/2014 | Bedard et al. | 180/190 |
| 2009/0183587 | A1 | * | 7/2009 | Amce | 74/489 |

FOREIGN PATENT DOCUMENTS

| DE | 10236164 A1 | 2/2004 |
|---|---|---|
| EP | 1710197 B1 | 10/2006 |
| WO | 2011153494 A2 | 12/2011 |

OTHER PUBLICATIONS

MEDER electronic, Products for tomorrow . . . Newsletter, Feb. 2012, Reed PRODUCTS . . . [http://www.meder.com/news_022012.html].
POLARIS Sales Inc., Owner's Manual Supplement 1999 Sportsman 500 PN 9914910.

* cited by examiner

*Primary Examiner* — Hai Huynh
(74) *Attorney, Agent, or Firm* — Ingrassia Fisher & Lorenz, P.C.

(57) ABSTRACT

A throttle control assembly includes a cable lever, a switch assembly, a throttle control device, and a switch engagement surface. The cable lever is adapted for coupling to a throttle cable and is configured, upon receipt of a drive torque, to rotate. The switch assembly is coupled to the cable lever and includes a switch that is movable between a first position and a second position. The throttle control device has the switch engagement surface formed on a portion of its inner surface. The switch engagement surface is configured, upon rotation of the throttle control device, to selectively move the switch between the first position and the second position and selectively rotate the switch assembly to thereby supply the drive torque to the cable lever.

12 Claims, 4 Drawing Sheets

THROTTLE CONTROL ASSEMBLY WITH INTEGRATED SAFETY SWITCH

TECHNICAL FIELD

The present invention generally relates to throttle control devices, and more particularly relates to a throttle control assembly that includes an integrated safety switch.

BACKGROUND

Many recreational vehicles, such as, for example, all-terrain vehicles (ATVs) and snowmobiles, include a throttle control that is manipulated by an operator's hand and, more particularly, by the thumb on one of the operator's hands. These types of throttle controls are typically coupled to a throttle cable that, when manipulated via the throttle control, varies the flow of fuel and/or air to the engine, thereby controlling the acceleration and speed of the vehicle.

Although presently known throttle controls, such as the one described above, are generally safe and reliable, these controls can exhibit certain drawbacks. For example, if certain postulated throttle cable malfunctions were to occur, the throttle control may not allow an operator to sufficiently control the speed and/or acceleration of the vehicle. These postulated malfunctions include both a broken throttle cable and a stuck throttle cable.

Hence, there is a need for a throttle control that will allow an operator to sufficiently control the speed and/or acceleration of a vehicle if a postulated throttle cable malfunction occurs. The present invention addresses at least this need.

BRIEF SUMMARY

In one embodiment, a throttle control assembly includes a cable lever, a switch assembly, a throttle control device, and a switch engagement surface. The cable lever is adapted for coupling to a throttle cable. The cable lever is configured to receive a drive torque and, upon receipt of the drive torque, to rotate. The switch assembly is coupled to the cable lever and is configured to selectively rotate and supply the drive torque to the cable lever. The switch assembly includes a switch that is movable between a first position and a second position. The throttle control device is configured to rotate about an axis, and has an outer surface and an inner surface. The outer surface has a thumb lever extending outwardly therefrom, and the inner surface defines an opening within which at least a portion of the switch assembly is disposed. The switch engagement surface is formed on a portion of the inner surface of the throttle control device and is configured, upon rotation of the throttle control device, to selectively move the switch between the first position and the second position and selectively rotate the switch assembly to thereby supply the drive torque to the cable lever.

In another embodiment, a throttle control assembly includes a cable lever, a switch assembly, a throttle control device, a spring, and a switch engagement surface. The cable lever is adapted for coupling to a throttle cable. The cable lever is configured to receive a drive torque and, upon receipt of the drive torque, to rotate. The switch assembly is coupled to the cable lever and is configured to selectively rotate and supply the drive torque to the cable lever. The switch assembly includes a switch housing, a switch that is disposed at least partially within the switch housing and is movable between a first position and a second position, and a cable lever axle that is coupled to the switch housing and the cable lever. The throttle control device is configured to rotate about an axis between a minimum throttle position and a maximum throttle position, and has an outer surface and an inner surface. The outer surface has a thumb lever that extends outwardly therefrom, and the inner surface defines an opening within which at least a portion of the switch assembly is disposed. The spring is coupled to the throttle control device and the switch assembly. The spring supplies a bias force that biases the throttle control device toward the minimum throttle position. The switch engagement surface is formed on a portion of the inner surface of the throttle control device and is configured, upon rotation of the throttle control device, to selectively engage the switch assembly, to thereby selectively rotate and supply the drive torque to the cable lever, and selectively move the switch between the first position and the second position.

In still another embodiment, a throttle control assembly includes a cable lever, a throttle control device, a thumb lever, a switch, and a switch engagement surface. The cable lever is adapted for coupling to a throttle cable. The cable lever is configured to receive a drive torque and, upon receipt of the drive torque, to rotate. The throttle control device is coupled to the cable lever and is configured to rotate about an axis and supply the drive torque to the cable lever. The thumb lever is rotationally coupled to, and extends outwardly from, the throttle control device. The thumb lever is configured, upon application of a force in a first direction, to cause the throttle control device to rotate. The switch is coupled to the throttle control device and is movable between a first position and a second position. The switch engagement surface is formed on a portion of the thumb lever and is configured, upon application of a force to the thumb lever, to selectively move the switch between the first position and the second position.

Furthermore, other desirable features and characteristics of the throttle control assembly will become apparent from the subsequent detailed description and the appended claims, taken in conjunction with the accompanying drawings and the preceding background.

BRIEF DESCRIPTION OF THE DRAWINGS

The present invention will hereinafter be described in conjunction with the following drawing figures, wherein like numerals denote like elements, and wherein.

DETAILED DESCRIPTION

The following detailed description is merely exemplary in nature and is not intended to limit the invention or the application and uses of the invention. As used herein, the word "exemplary" means "serving as an example, instance, or illustration." Thus, any embodiment described herein as "exemplary" is not necessarily to be construed as preferred or advantageous over other embodiments. All of the embodiments described herein are exemplary embodiments provided to enable persons skilled in the art to make or use the invention and not to limit the scope of the invention which is defined by the claims. Furthermore, there is no intention to be bound by any expressed or implied theory presented in the preceding technical field, background, brief summary, or the following detailed description.

Figure 1:
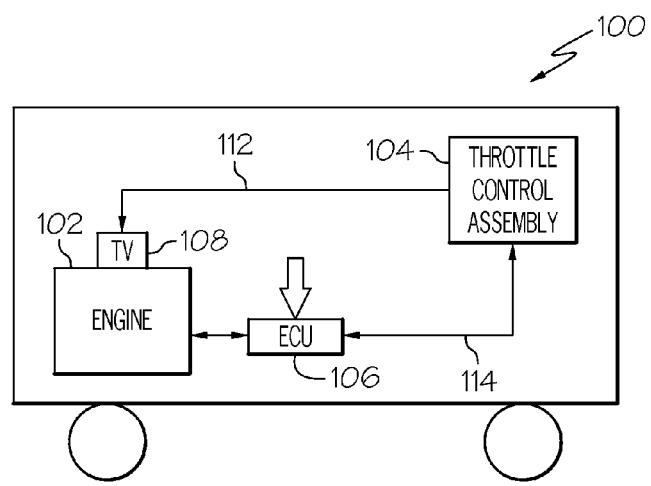
FIG. 1 depicts a simplified functional block diagram of a vehicle.

Referring to FIG. 1, a simplified functional block diagram of a vehicle 100 is depicted. The depicted vehicle 100 includes, among various other non-illustrated components, an engine 102, a throttle control assembly 104, and an engine control unit (ECU) 106. The engine 102, at least in the depicted embodiment, is a gas-powered, internal combustion engine. The rotational speed of the engine 102, and thus the speed and acceleration of the vehicle 100, is varied by controlling the flow rate of air into the engine 102, and thus the fuel/air ratio.

The flow rate of air into the engine 102 is controlled via the throttle control assembly 104. In the depicted embodiment, the throttle control assembly 104, an embodiment of which will be described in more detail further below, controls the flow rate of air by varying the position of a throttle valve 108. To do so, the throttle control assembly 104, which is disposed remote from the throttle valve 108, is coupled to the throttle valve 108 via a throttle cable 112. An operator of the vehicle 100 may position the throttle valve 108, and thus control the speed and acceleration of the vehicle 100, by manually positioning the throttle control assembly 104.

The ECU 106 is coupled to receive various sensor signals from various, non-illustrated sensors disposed within the engine 102 and/or other locations on the vehicle 100. These sensors may include, but are not limited to, a throttle position sensor, a speed sensor, and a temperature sensor, just to name a few. As will be described in more detail further below, the ECU 106 also receives a switch position signal 114 from the throttle control assembly 104. The ECU 106 is coupled to receive the sensor signals and the switch position signal and is configured, in response to these signals, to control the operational mode of the engine 102. For example, the ECU 106 may control the engine 102 to operate in a "normal" mode, in which engine speed is controlled via the throttle control assembly 104. The ECU 106 may also control the engine 102 to operate in a "limited" operational mode, in which the speed of the engine 102 is limited to a relatively low speed. In some instances the ECU 106 may cause the engine 102 to completely shut down.

Figure 2:
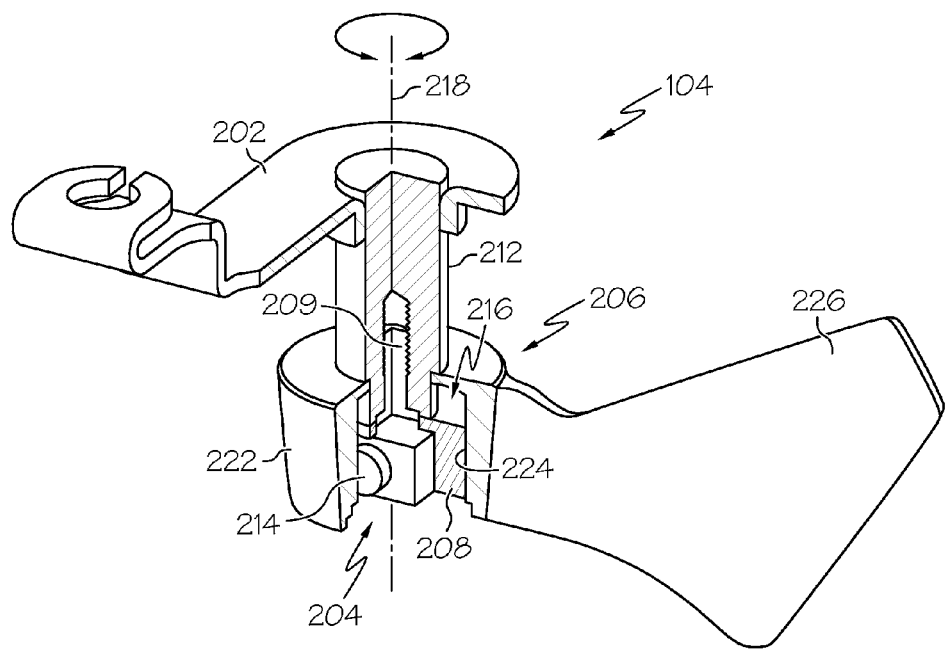
FIGS. 2 and 3 depict a partial cross section view and an exploded view, respectively, of an embodiment of a throttle control assembly that may be used with the vehicle of FIG. 1.
Figure 3:
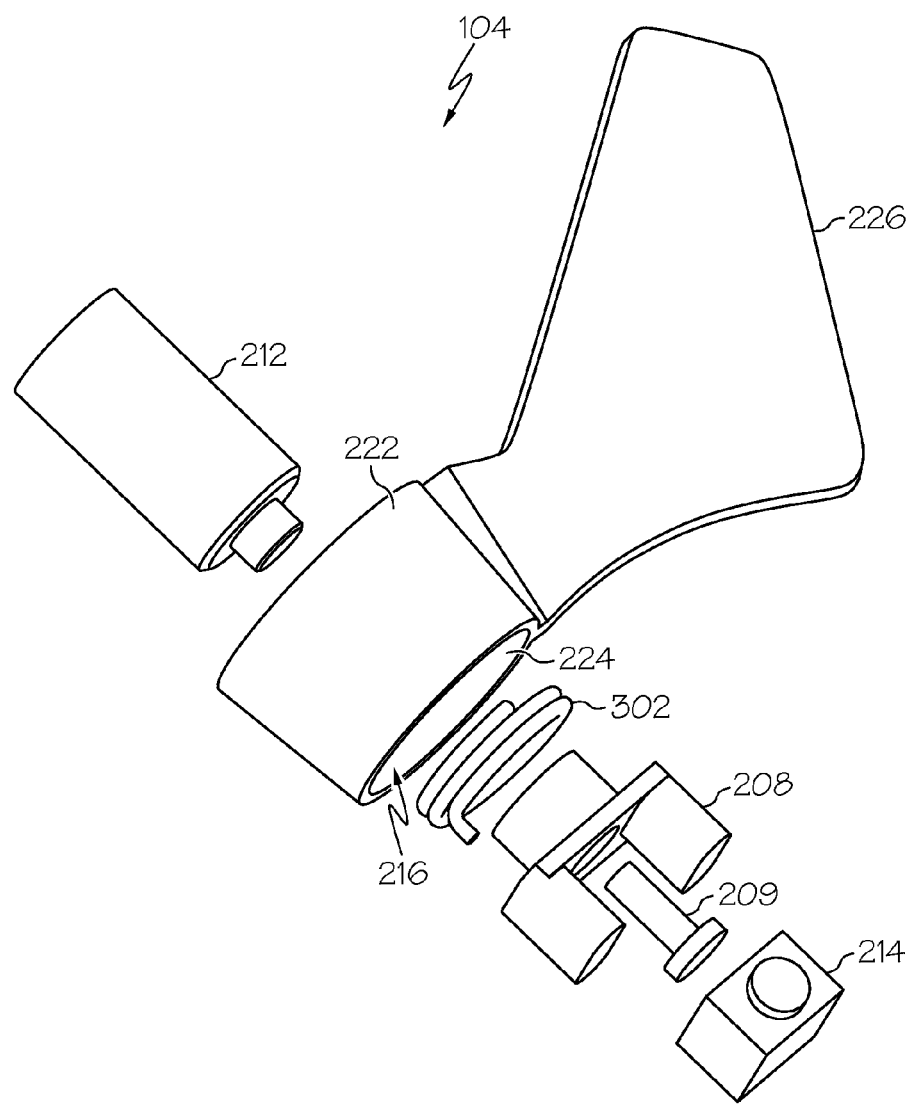

With reference now to FIGS. 2 and 3, a partial cross section view and an exploded view, respectively, of an embodiment of the throttle control assembly 104 are depicted. The depicted throttle control assembly 104 includes a cable lever 202, a switch assembly 204, and a throttle control device 206. The cable lever 202 is coupled to the throttle cable 112. The cable lever 202 is also coupled to receive a drive torque and is configured, upon receipt of the drive torque, to rotate.

The switch assembly 204 is coupled to the cable lever 202 and is configured to selectively rotate and supply the drive torque to the cable lever 202. The switch assembly 202 may be variously configured and implemented, but in the depicted embodiment it includes a switch housing 208, a cable lever axle 212, and a switch 214. The switch housing is disposed within an opening 216 formed in the throttle control device 206. The cable lever axle 212 extends from the opening 216 of the throttle control device 206, and is coupled to both the switch housing 208 and the cable lever 202. In the depicted embodiment, the cable lever axle 212 is coupled to the switch housing 208 via a fastener 209, and is press-fit into an opening in the cable lever 202.

The switch 214 is disposed within the switch housing 208 and is movable between a first position and a second position, and is configured, when properly connected, to supply the switch position signal 114 to the ECU 106. The first and second positions may be, for example, an "open" position and a "closed" position, respectively, or a "closed" position and an "open" position, respectively. Alternatively, the first and second positions may be positions that simply vary the magnitude of the switch position signal 114. In the depicted embodiment, however, the first position corresponds to an "open" position, and the second position corresponds to a "closed" position. Although the switch 214 may be variously configured and implemented, it is preferably has at least an IP (ingress protection) rating of 67 (e.g., IP67). Moreover, although the depicted switch 214 is implemented using a tact switch, it could also be implemented using any one of numerous suitable switches including, for example, a reed switch or a snap acting switch, just to name a few.

The throttle control device 206 is configured to rotate about an axis 218, and includes an outer surface 222 and an inner surface 224. The outer surface 222 has a thumb lever 226 extending outwardly therefrom, and the inner surface 224 defines the opening 216 within which at least a portion of the switch assembly 204 is disposed. The throttle control device 206 is rotatable, about the axis 218, between a minimum throttle (or idle) position and a maximum throttle position. As FIG. 3 depicts more clearly, the throttle control assembly 104 additionally includes a spring 302. The spring 302 is coupled to the throttle control device 206 and the switch assembly 204, and supplies a bias force that biases the throttle control device 206 toward the minimum throttle position. The purpose for this will become apparent further below.

Figure 4:
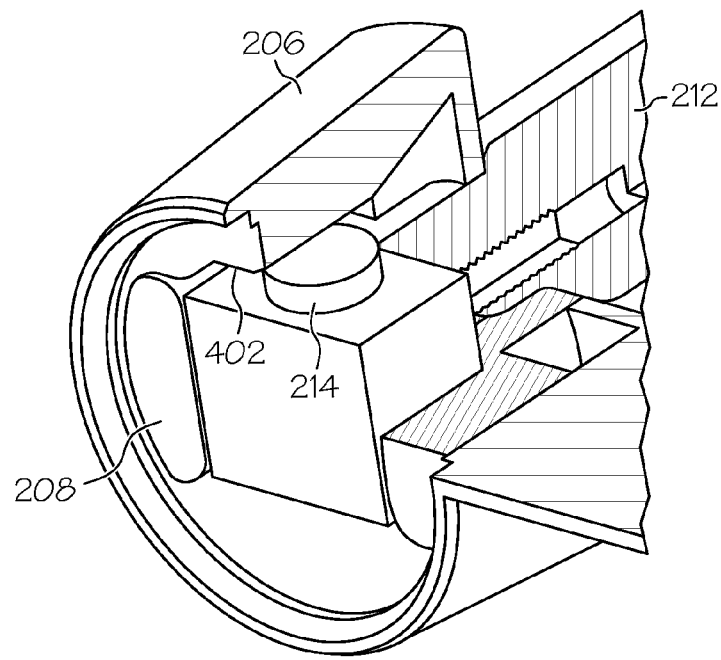
FIGS. 4 and 5 depict close-up cross section and bottom views of the throttle control assembly depicted in FIGS. 2 and 3.
Figure 5:
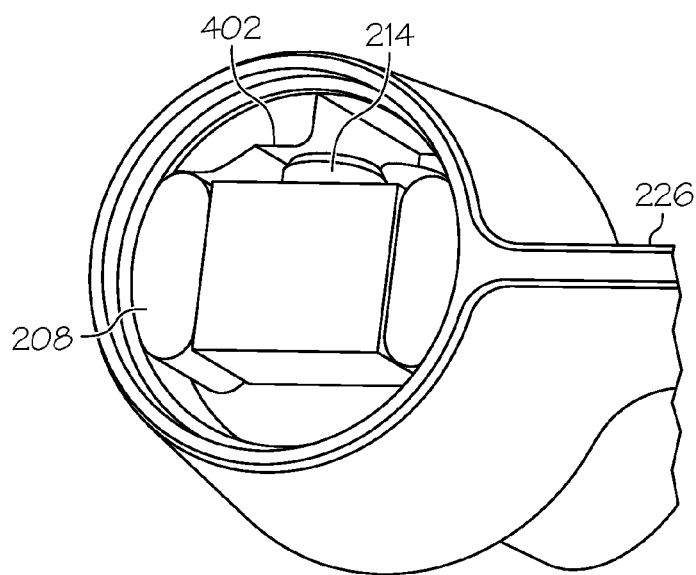

Referring now to FIGS. 4 and 5, it is seen that a switch engagement surface 402 is formed on a portion of the inner surface 224 of the throttle control device 206. The switch engagement surface 402 is configured, upon rotation of the throttle control device 206, to selectively move the switch 208 between the first position and the second position. The switch engagement surface 402 is additionally configured, upon rotation of the throttle control device 206, to selectively rotate the switch assembly 204 to thereby supply the drive torque to the cable lever 202. The manner in which this functionality is achieved will now be described.

The throttle control assembly 104 is configured such that the throttle control device 206 is rotatable relative to the switch housing 208. With this configuration, when the throttle control device 206 is in the minimum throttle position, which is the position depicted in FIGS. 4 and 5, the switch engagement surface 402 does not actuate the switch 214 nor cause rotation of the switch assembly 204. However, when the throttle control device 104 is rotated a predetermined amount out of the minimum throttle position and toward the maximum throttle position, the switch engagement surface 402 actuates the switch 214, thereby moving it from the first position to the second position, and engages the switch housing 208, thereby causing rotation of the switch assembly 204. It should be noted that in the depicted embodiment, the switch engagement surface 402 is configured such that, upon rotation of the throttle control device from the minimum throttle position toward the maximum throttle position, it moves the switch 214 to the first position before it rotates switch assembly 204.

Having described the structural features and the overall function of the throttle control assembly 104, a more detailed description of its operation will now be described. Initially, it is assumed that the throttle control device 204 is in the minimum throttle position. Thereafter, as user initially applies a force to the thumb lever 226, the throttle control device 206 will rotate, against the bias force of the spring 302 and relative to the switch housing 208, out of the minimum throttle position. When the throttle control device 206 is rotated to the predetermined position, the switch engagement surface 402 moves the switch 214 from the first position to the second position, supplying the switch signal 114 to the ECU 106 indicating that the throttle control assembly 104 is initiating engine speed control. As the throttle control device 206 is rotated beyond this position, it causes the switch assembly 204 to rotate, which in turn causes the cable lever 202 to rotate. Rotation of the cable lever 202 supplies a force to the throttle cable 112, which in turn positions the throttle valve 108.

As previously noted, it is postulated that certain unlikely events may occur during vehicle operation. One such unlikely event is a broken throttle cable 112. If this unlikely, yet postulated event were to occur, the bias force supplied by the spring 302 would generate relative motion between the throttle control device 206 and the cable lever 202, and thus also the switch assembly 204. As such, the switch engagement surface 402 would no longer engage the switch 214, and the switch 214 would return to the second position. This would thus signal this event to the ECU 106.

Another unlikely, yet postulated event is a stuck throttle cable 112. If this were to occur, the user would feel a relatively high resistance to the otherwise easy actuation of the throttle control device 206. In response, the user may then release the thumb lever 202. Here again, the bias force supplied by the spring 302 would generate relative motion between the throttle control device 206 and the cable lever 202, and thus also the switch assembly 204. As such, the switch engagement surface 402 would no longer engage the switch 214, and the switch 214 would return to the second position. This would thus signal this event to the ECU 106.

Figure 6:
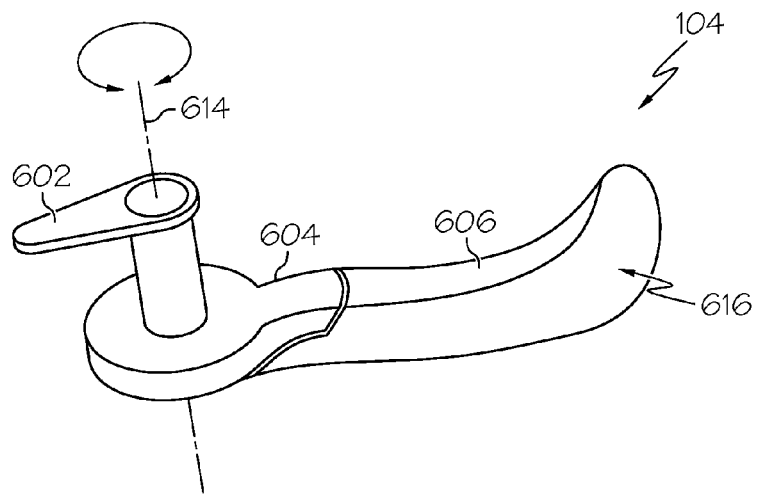
FIGS. 6 and 7 depict plan views and bottom view, respectively, of an alternative embodiment of a throttle control assembly.
Figure 7:
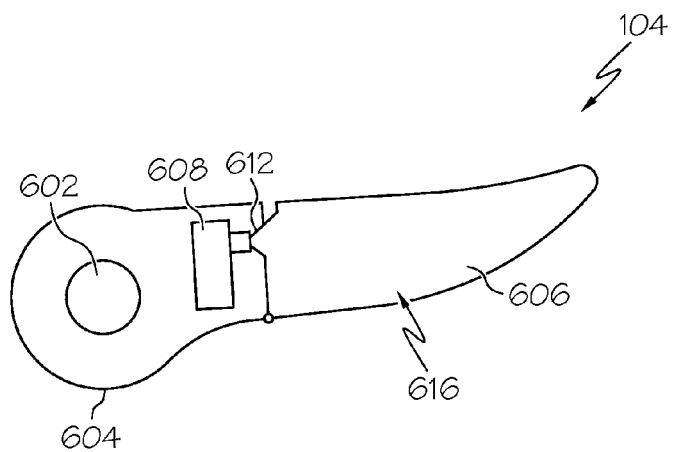

The throttle control assembly 104 depicted in FIGS. 2-5 is merely exemplary of one particular embodiment. Another exemplary embodiment is depicted in FIGS. 6 and 7, and includes cable lever 602, a throttle control device 604, a thumb lever 606, a switch 608, and a switch engagement surface 612. The cable lever 602 is coupled to the throttle cable 112. The cable lever 602 is also coupled to receive a drive torque and is configured, upon receipt of the drive torque, to rotate.

The throttle control device 604 is coupled to the cable lever 602 and is configured to rotate about an axis 614 and supply the drive torque to the cable lever 602. The thumb lever 606 is rotationally coupled to, and extends outwardly from, the throttle control device 604. The thumb lever 606 is configured, upon application of a force in a first direction 616, to cause the throttle control device 604 to rotate about the axis 614.

The switch 608 is coupled to the throttle control device 604 and is movable between a first position and a second position. As with the previously described embodiment, the switch 608 is configured, when properly connected, to supply the switch position signal 114 to the ECU 106. The first and second positions may be, for example, an "open" position and a "closed" position, respectively, or a "closed" position and an "open" position, respectively. Alternatively, the first and second positions may be positions that simply vary the magnitude of the switch position signal 114. In the depicted embodiment, however, the first position corresponds to an "open" position, and the second position corresponds to a "closed" position.

Unlike the other embodiment, the switch engagement surface 612 of this embodiment is formed on a portion of the thumb lever 606. Similar to the other embodiment, however, the switch engagement surface 612 is configured, upon application of a force to the thumb lever 606, to selectively move the switch 608 between the first position and the second position.

The embodiments described herein provide significant advantages over current throttle control assemblies. The switch is preferably at least an IP67 rated switch, and is thus sealed for reliability. The switch is integrated into throttle control device thereby reducing the number of wires and parts, and thus the complexity, relative to existing products.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations The various illustrative logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. The process steps may be interchanged in any order without departing from the scope of the invention as long as such an interchange does not contradict the claim language and is not logically nonsensical.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A throttle control assembly, comprising:
   a cable lever adapted for coupling to a throttle cable, the cable lever configured to receive a drive torque and configured, upon receipt of the drive torque, to rotate;
   a switch assembly coupled to the cable lever and configured to selectively rotate and supply the drive torque to the cable lever, the switch assembly including a switch that is movable between a first position and a second position;
   a throttle control device configured to rotate about an axis, the throttle control device having an outer surface and an inner surface, the outer surface having a thumb lever extending outwardly therefrom, the inner surface defining an opening within which at least a portion of the switch assembly is disposed; and
   a switch engagement surface formed on a portion of the inner surface of the throttle control device and configured, upon rotation of the throttle control device, to (i) selectively move the switch between the first position and the second position and (ii) selectively rotate the switch assembly to thereby supply the drive torque to the cable lever.

2. The assembly of claim 1, wherein:
   the throttle control device is rotatable between a minimum throttle position and a maximum throttle position; and
   the assembly further comprises a spring coupled to the throttle control device and the switch assembly, the spring supplying a bias force that biases the throttle control device toward the minimum throttle position.

3. The assembly of claim 2, wherein:
   the switch engagement surface does not engage the switch assembly when the throttle control device is in the minimum throttle position; and
   the switch engagement surface engages the switch assembly when the throttle control device is rotated a predetermined amount toward the maximum throttle position.

4. The switch assembly of claim 3, wherein the switch engagement surface is configured, upon rotation of the throttle control device from the minimum throttle position toward the maximum throttle position, such that it moves the switch to the first position before it rotates switch assembly.

5. The assembly of claim 1, wherein the switch assembly further comprises:
   a switch housing disposed within the opening of the throttle control device, the switch disposed within the switch housing;
   a cable lever axle coupled to the switch housing and the cable lever, the cable lever axle extending from the opening of the throttle control device.

6. The assembly of claim 5, wherein the throttle control device is rotatable relative to the switch housing.

7. The assembly of claim 6, wherein the throttle control device does not rotate the switch assembly until the switch engagement surface engages the switch housing.

8. A throttle control assembly, comprising:
   a cable lever adapted for coupling to a throttle cable, the cable lever configured to receive a drive torque and configured, upon receipt of the drive torque, to rotate;
   a switch assembly coupled to the cable lever and configured to selectively rotate and supply the drive torque to the cable lever, the switch assembly including a switch housing, a switch disposed at least partially within the switch housing and movable between a first position and a second position, and a cable lever axle coupled to the switch housing and the cable lever;
   a throttle control device configured to rotate about an axis between a minimum throttle position and a maximum throttle position, the throttle control device having an outer surface and an inner surface, the outer surface having a thumb lever extending outwardly therefrom, the inner surface defining an opening within which at least a portion of the switch assembly is disposed;
   a spring coupled to the throttle control device and the switch assembly, the spring supplying a bias force that biases the throttle control device toward the minimum throttle position; and
   a switch engagement surface formed on a portion of the inner surface of the throttle control device and configured, upon rotation of the throttle control device, to (i) selectively engage the switch assembly, to thereby selectively rotate and supply the drive torque to the cable lever, and (ii) selectively move the switch between the first position and the second position.

9. The assembly of claim 8, wherein:
   the switch engagement surface does not engage the switch assembly when the throttle control device is in the minimum throttle position; and
   the switch engagement surface engages the switch assembly when the throttle control device is rotated a predetermined amount toward the maximum throttle position.

10. The assembly of claim 8, wherein the throttle control device is rotatable relative to the switch housing.

11. The assembly of claim 10, wherein the throttle control device does not rotate the switch assembly until the switch engagement surface engages the switch housing.

12. A throttle control assembly, comprising:
- a cable lever adapted for coupling to a throttle cable, the cable lever configured to receive a drive torque and configured, upon receipt of the drive torque, to rotate;
- a throttle control device coupled to the cable lever and configured to rotate about an axis and supply the drive torque to the cable lever;
- a thumb lever rotationally coupled to, and extending outwardly from, the throttle control device, the thumb lever configured, upon application of a force in a first direction, to cause the throttle control device to rotate;
- a switch coupled to the throttle control device and movable between a first position and a second position; and
- a switch engagement surface formed on a portion of the thumb lever and configured, upon application of a force to the thumb lever, to selectively move the switch between the first position and the second position.

* * * * *